United States Patent Office 3,210,124
Patented Oct. 5, 1965

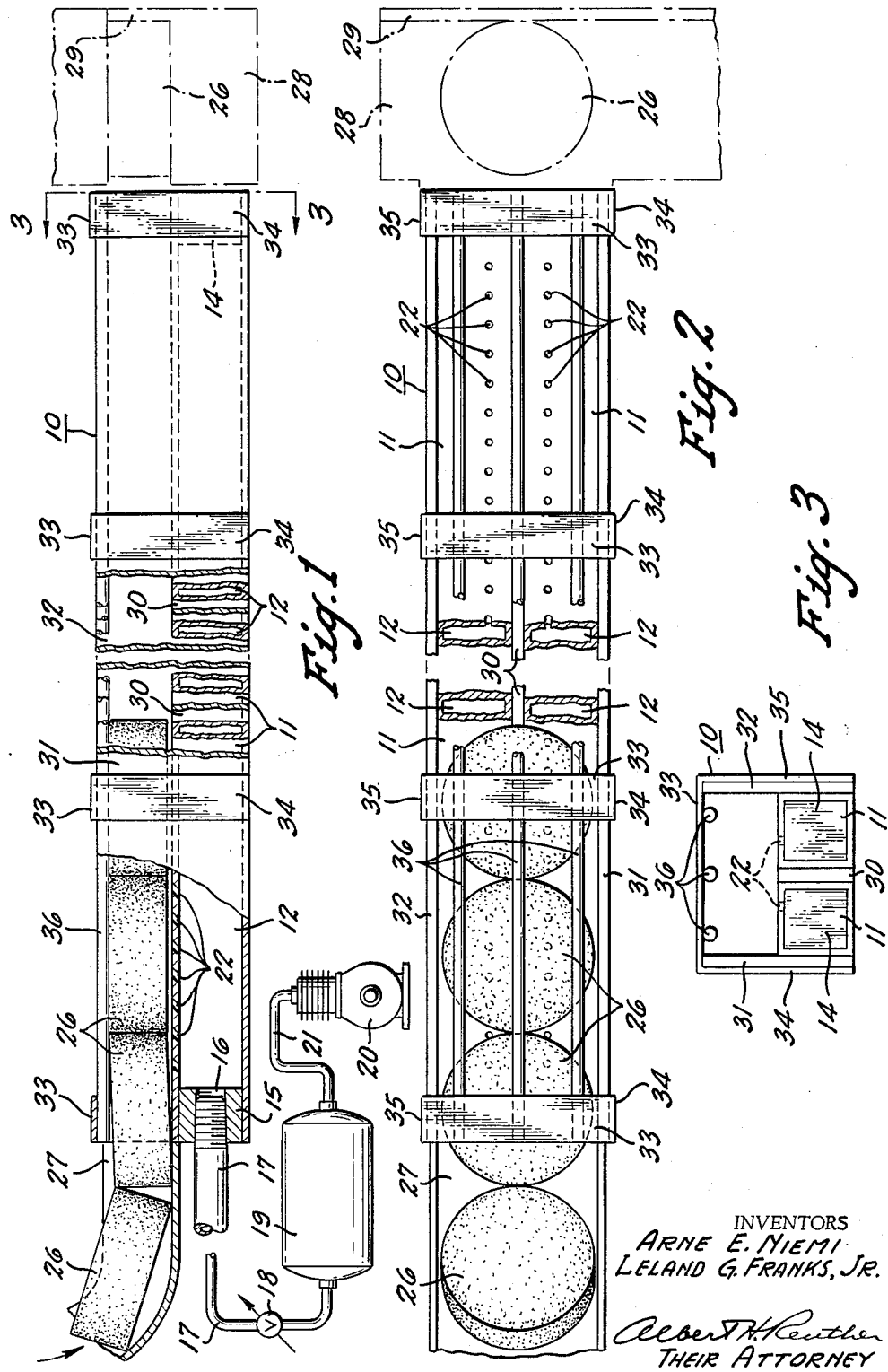

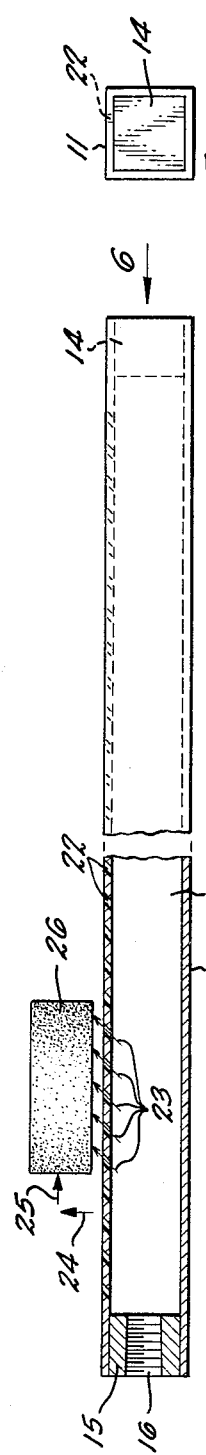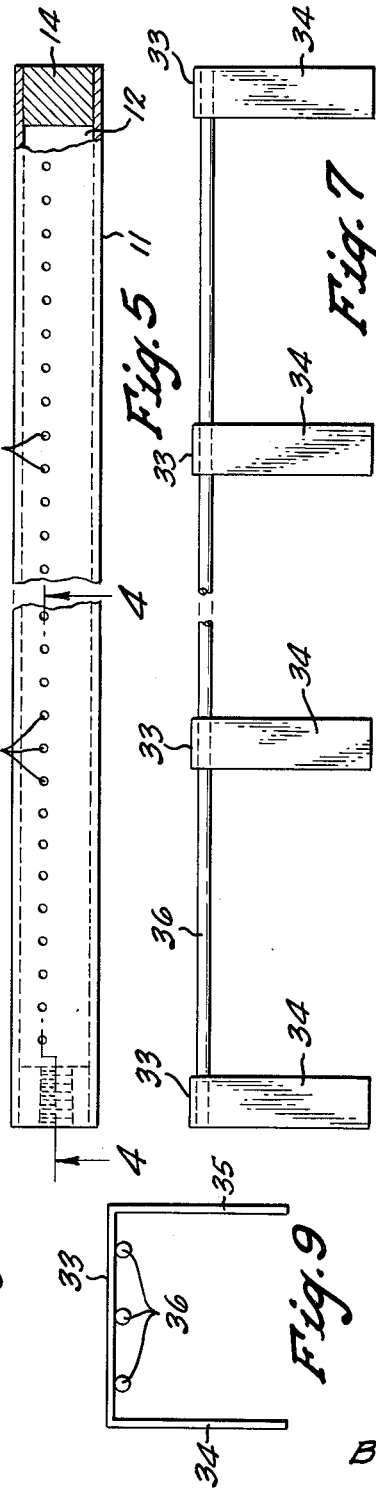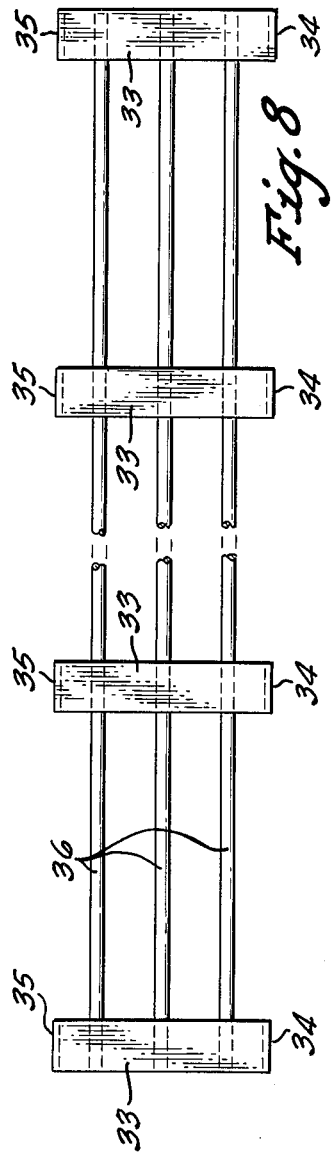

3,210,124
AIR FEED CONVEYOR
Arne E. Niemi and Leland G. Franks, Jr., Warren, Ohio, assignor to General Motors Corporation, Detroit, Mich., a corporation of Delaware
Filed Sept. 23, 1963, Ser. No. 310,796
2 Claims. (Cl. 302—2)

This invention relates to conveyors, and particularly to manufacturing of devices requiring transfer of components which previously have resulted in considerable conveyor maintenance that can be minimized in accordance with the present invention.

The problem of wear due to engagement of parts on a conveyor can result in considerable expense and loss of time. Generally, conveyors per se have moving parts that require servicing and that limit versatility as well as rate of movement.

An object of the present invention is to eliminate such wear problems though enhancing speed range and flexibility of conveyor use.

Another object is to provide structure adaptable to many applications for cushioned though progressive supply of material along straight as well as a compound curved or elevated paths for flexibility free of previous wearing by vibration, belt and chain conveyor portions which result in frequent time loss and maintenance.

A further object of this invention is to provide a conveying medium having basic parts including a pressurized fluid manifold means having angularly disposed passages longitudinally aligned therein, opposite side portions used to maintain positioning of conveyed parts along the manifold means, and an outer cage or cover portion for shielding the manifold means and/or for enabling conveyed parts to be restrained from escaping outwardly divergent from a predetermined path of movement whenever increased velocities are required. The cage or outer cover portion can include plural rails or rods joined laterally adjacent to each other by plural U-shaped brackets.

Another object of this invention is to provide an air feed conveyor having at least opposite side portions between which there is a manifold means of base material having a plurality of holes therethrough at a given angle from vertical to provide an air stream from a controllable pressurized source converted into jets applying resultant force whereby a part to be moved is both lifted off of the base material and moved simultaneously longitudinally thereof subject to readily variable speed change and endless cushioning to feed parts material progressively with controlled thrust to a station where further use can be made of the parts material.

Further objects and advantages will be apparent from the following description, reference being had to the accompanying drawings wherein preferred embodiments of the present invention are clearly shown.

In the drawings:

FIGURE 1 is a partially sectioned view of an air feed conveyor assembly in accordance with the present invention.

FIGURE 2 is a top view of the assembly of FIGURE 1.

FIGURE 3 is an end view of the assembly of FIGURES 1 and 2.

FIGURE 4 is a partially sectioned side view of a manifold portion of base material for the air feed conveyor of FIGURES 1–3.

FIGURE 5 is a top view of the manifold portion of FIGURE 4.

FIGURE 6 is an end view of the manifold portion of FIGURES 4 and 5.

FIGURES 7, 8 and 9 are side, top and end views respectively of a cage or cover portion for use in the assembly of FIGURES 1–3.

In FIGURES 1, 2 and 3 there can be sen an air feed conveyor assembly generally indicated by numeral 10 having features in accordance with the present invention. This assembly 10 includes three basic parts of which the base portion of manifold means 11 can provide a solution to wear and maintenance problems with considerable advantages over conventional vibration, belt, and chain conveyors previously utilized. This manifold means 11 can be seen more specifically in view of FIGURES 4, 5 and 6. The manifold means serves as a base of the conveyor and is made of a suitable material such as extruded aluminum and the like for weight reduction and for obviating possible corrosion or rusting which can also present a maintenance problem. The base material or manifold means 11 can be formed into a cross section including four integral walls as can be best seen in views of FIGURES 3 and 6. The manifold means thus will include a hollow interior 12 which can be closed or sealed at one end by a plug or member 14 press-fitted or otherwise secured thereto. An opposite end can be provided with another closure member 15 having a passage therethrough with tap threading 16 visible in view of FIGURES 1 and 4. A conduit fitting 17 can be joined to this threaded aperture. A variable control or valve means 18 can be provided with the conduit for variation and supply of pressurized fluid medium such as air from a high pressure storage tank or source 19. A compressor means 20 can be joined by a suitable conduit 21 to this high pressure storage means or source as indicated in FIGURE 1.

In accordance with the present invention, the manifold means 11 is provided with a plurality of angularly disposed passages or holes 22 indicated in views of FIGURES 1 as well as 3–5. These holes or passages are inclined and substantially parallel to each other as jets through which pressurized air or fluid medium can flow as represented by arrows 23 in FIGURE 4. The arrows 23 transmit force which can be broken down into components or factors including a vertical force of arrows 24 as well as a horizontal force of arrow 25 effective upon plastic material or part 26 to be conveyed without having any moving parts in the conveyor per se such as in previous moving belt and/or vibration or chain-like conveyor components which previously could be driven by gears or moving chains. Movement is imparted only to the material or component 26 to be conveyed from an entry portion 27 indicated in FIGURES 1 and 2 into a work station 28 which can have a stop or transverse wall 29 as indicated in FIGURE 2. The material 26 can be a plastic mass or annular disc of raw material to be molded into a plastic part such as a fuse panel assembly as disclosed in a Patent 2,955,178—Lander et al. issued October 4, 1960, to the assignee of the present invention. Such a disc or slug of plastic material 26 can be subjected to a molding operation with increased efficiency and involving less maintenance and labor cost due to failure of conveyor means to supply such raw material to a molding station.

As can be seen in the view of FIGURE 5, the holes or passages 22 can be longitudinally aligned in a location offset to one side of a center line through the threaded aperture 16. A pair of such manifold means 11 can be provided adjacent to each other as shown in the end view of FIGURE 3. An optional rectangular spacer plate 30 can be fitted and joined therebetween. Width of this spacer plate 30 can determine the distance between jet passages or tubular holes 22 of adjoining manifold means 11. A pair of side portions or walls 31 and 32 can be located parallel to each other on either side of the manifold means in locations remote from the central spacer plate 30. The height of the walls or sides 31 and 32 is substantially greater than that of the manifold means and spacer plate. Thus the sides or walls 31 and 32 collectively with an upper surface of the manifold can provide a substantially U-shaped channel along which the parts material 26 can be moved with a simultaneous forward thrusting and upward resilient cushioning due to components of collective force of air under pressure passing through the plural angularly disposed passages or holes 22. It is to be understood that the predetermined path formed by the manifold means and opposite side walls can be not only straight as well as curved laterally in opposite directions but also upwardly and downwardly to reach a location such as the work station 28.

A removable cover means or cage portion illustrated in views of FIGURES 7, 8 and 9 can be provided for the assembly of FIGURES 1, 2 and 3. A plurality of U-shaped brackets 33 can be provided to have downwardly extending integral legs 34 and 35 which can fit around opposite outer surfaces of the sides 31 and 32. The brackets 33 can be attached to rods or rail means 36 which can extend substantially parallel to each other though laterally spaced from each other by the brackets 33. These rails or rods 36 can be round or rectangular in cross section and can be varied in width. It is to be understood that a solid closure or cover place could also be provided in place of the rods or rails 36 and this would limit escape of pressurized air to only an open end adjacent to the station 28. Such limiting of the escape of air would provide in effect a venturi flow of air with even greater velocity for movement of the parts material 26. The rails or rods 36 however can restrain the parts material 26 from escaping outwardly though generally the weight of the parts material 26 per se is sufficient to maintain positioning thereof along the U-shaped channel subject to a predetermined setting of the variable valve control means 18. It is to be understood that in the event the manifold means or base material is made to include a predetermined curved path such corresponding curvature in the path can be followed by the side walls and cover portion. The rods or rails 36 can be located laterally adjacent to each other as best shown in views of FIGURES 3 and 9. Suitable welding or brazing can be used to secure the brackets 33 and rods or rails 36 in assembled relationship.

The manifold means can serve as the base of the conveyor having holes or passages drilled at a predetermined angle from the vertical to provide pressurized and directed flow of air jets transmitting resultant force that simultaneously raises the parts material 26 being conveyed on an air cushion at a predetermined distance off of the upper surface of the base material of the manifold means and simultaneously thrusting and moving the parts material 26 therealong. The side plates can be deemed to supplement the manifold means as the second of three basic parts. The cover or outer cage portion is the third of these basic parts. The cage or cover portion helps to contain or restrict lifting of the parts material 26 during conveyance thereof at higher velocities. The rods or rails 36 enable the parts material 26 to ride or pass along an underside thereof. It is to be noted that the conveyor assembly per se has no moving parts and the velocity or speed range at which parts material can be conveyed is a function of air pressure and air flow. Adjustment of the variable valve control means 18 can be accomplished from a location remote from the conveyor assembly and can be accomplished for speed changes over a wide range. The parts material 26 can be moved readily to various work stations or multiple locations and the conveyor assemblies can be positioned adjacent to each other for movement of many work pieces to many work stations simultaneously on a molding machine.

The air feed conveyor in effect provides an endless conveyor bed using air means to lift the parts material such as 26 off of the bed on a cushion of air while simultaneously thrusting and progressively conveying the parts material to another location in accordance with the angle of feed of the holes or passages 26.

While the embodiments of the present invention as herein disclosed constitute a preferred form, it is to be understood that other forms might be adopted.

What is claimed is as follows:

1. An assembly for an air fed conveyor means that supplies slugs of raw plastic mass for fuse panel mold operation, comprising, a solid central spacer plate, a pair of squared extruded aluminum manifold portions each having small annular holes inclined and substantially parallel to each other in spaced relation directly on opposite sides of said solid central spacer plate, a source of pressurized fluid medium, a variable valve control means in a conduit from said source and connected to said manifold portions, a pair of opposite side walls parallel to each other on either side of said manifold portions in locations remote from said solid central spacer plate collectively therewith in a substantially U-shaped channel along which the slugs move with a simultaneous forward thrusting and upward resilient cushioning due to supply of pressurized fluid force entirely from said holes all underneath the slugs, and a removable cover-cage portion including a plurality of U-shaped brackets with downwardly extending integral legs that fit around opposite outer surfaces of said sides as well as several rail means secured to said brackets, said rail means extending substantially parallel to each other though spaced from said solid central spacer plate and said pair of manifold portions having the small annular holes inboard of outer rail means which restrain slugs from escaping due to pressurized fluid force axially of the small annular holes.

2. In an assembly of an air feed conveyor means that supplies solid slugs of raw plastic mass for fuse panel mold operation and that includes a pair of extruded light weight manifold portions each having small annular holes inclined and substantially parallel to each other, the improvement which comprises a solid central spacer plate immediately between the pair of manifold portions as well as opposite side walls parallel to each other on either side of said manifold portions in locations remote from said solid central spacer plate collectively therewith in a substantially U-shaped channel along which the slugs move with a simultaneous forward thrusting and upward resilient cushioning due to supply of pressurized fluid force entirely from said holes all underneath the slugs subjected to resultant force having vertical and horizontal components, and a removable cover-cage portion including a plurality of U-shaped brackets with downwardly extending integral legs that fit around opposite outer surfaces of said sides as well as three rail means secured to said brackets, said rail means extending substantially parallel to each other though spaced from said solid central spacer plate and said pair of manifold portions having the small annular holes inboard of outer rail means though outward of a center rail means in alignment with said solid central spacer.

References Cited by the Examiner

UNITED STATES PATENTS

| | | | |
|---|---|---|---|
| 2,342,680 | 2/44 | Melzer | 302—2 |
| 2,778,691 | 1/57 | Hazel | 302—2 |
| 3,105,720 | 10/63 | Barker | 302—2 |
| 3,129,978 | 4/64 | Szatkowski | 302—2 |
| 3,131,974 | 5/64 | Futer | 302—31 |

SAMUEL F. COLEMAN, *Primary Examiner.*

ANDRES H. NIELSEN, *Examiner.*